United States Patent [19]

Schmelz et al.

[11] Patent Number: 4,812,296

[45] Date of Patent: Mar. 14, 1989

[54] PROCESS UTILIZING CATALYTIC MATERIAL FOR THE REDUCTION OF NITROUS OXIDES

[75] Inventors: Helmut Schmelz, Prien; Helmut Thomann, Munich; Renate Kuschke, Feldkirchen-Westerham; Eva-Helga Wilbert, Munich; Wolfgang Gajewski, Buckenhof; Josef Sprehe, Fürth-Vach; Norbert Landgraf, Rückersdorf; Hans Ranly, Marloffstein; Lothar Balling, Fürth; Richard Reppisch, Herzogenaurach; Dietmar Hein, Nuremberg, all of Fed. Rep. of Germany

[73] Assignee: Siemens Aktiengesellschaft, Berlin and Munich, Fed. Rep. of Germany

[21] Appl. No.: 147,592

[22] Filed: Jan. 22, 1988

Related U.S. Application Data

[62] Division of Ser. No. 904,186, Sep. 5, 1986, abandoned.

[30] Foreign Application Priority Data

Sep. 6, 1985 [DE] Fed. Rep. of Germany ....... 3531809

[51] Int. Cl.$^4$ .......................... B01J 8/00; C01B 21/00
[52] U.S. Cl. ..................................... 423/239; 502/211
[58] Field of Search ................... 423/239, 239 A, 213, 423/2, 30; 502/209, 210, 211, 217, 219, 220, 221, 222

[56] References Cited

U.S. PATENT DOCUMENTS

| 2,773,836 | 12/1956 | Shalit et al. ................. 502/211 X |
| 2,824,073 | 2/1958 | Rylander, Jr. et al. ............. 502/208 |
| 3,086,026 | 4/1963 | Wiebusch ..................... 502/209 X |
| 3,684,741 | 8/1972 | Friedrichsen et al. ............. 502/209 |
| 3,821,324 | 6/1974 | Bertus ....................... 502/210 X |
| 4,018,706 | 4/1977 | Inoue et al. ................... 502/210 X |
| 4,152,296 | 5/1979 | Okabe et al. .................... 423/239 |
| 4,154,703 | 5/1979 | Umemura et al. ................ 502/209 |
| 4,276,197 | 6/1981 | Vartuli et al. .................. 502/209 |
| 4,466,947 | 8/1984 | Imanari et al. .................. 423/239 |

FOREIGN PATENT DOCUMENTS

| 2159442 | 7/1973 | Fed. Rep. of Germany ...... 502/209 |
| 1470581 | 3/1966 | France ......................... 502/209 |
| 52-51318 | 4/1977 | Japan .......................... 502/209 |
| 57-127426 | 8/1982 | Japan .......................... 423/239 |
| 57-162637 | 10/1982 | Japan .......................... 423/239 |
| 628943 | 9/1978 | U.S.S.R. ....................... 502/209 |

*Primary Examiner*—Gregory A. Heller
*Attorney, Agent, or Firm*—Herbert L. Lerner; Laurence A. Greenberg

[57] ABSTRACT

Catalytic material for reducing nitrous oxides in flue gases in the presence of ammonia in which titanium oxide is used as the starting material and the latter is milled together with vanadium oxide and one or more oxides of the elements tungsten, molybdenum, phosphorus, chromium, copper, iron, uranium and is thereafter subjected to at least one thermal treatment. Tungsten and molybdenum are substituted here entirely or partially by phosphorus in the form of its oxides or phosphates.

8 Claims, 1 Drawing Sheet

|     | Ti | W  | V   | P    |   |
|-----|----|----|-----|------|---|
| S3  | 72 | 23 | 4   | /    | 1 |
| W28 | 89 | /  | 0,8 | 10,2 | / |

PROCESS UTILIZING CATALYTIC MATERIAL FOR THE REDUCTION OF NITROUS OXIDES

This application is a division of application Ser. No. 904,186, filed Sept. 5, 1986, now abandoned.

BACKGROUND OF THE INVENTION

1. Field of the Invention

The invention relates to a catalytic material for reducing nitrous oxides in flue gases in the presence of ammonia.

2. Description of the Prior Art

It is known to reduce nitrous oxides in the flue gases catalytically to molecular nitrogen in the presence of ammonia (DE-AS No. 24 58 888=U.S. Pat. No. 4,085,198). To this end, the gas mixture is brought into contact with a catalyst in the temperature range of 150° to 550° C.; this catalyst consists of an intimate mixture of the following components:

(A) titanium in the form of oxides,
(B) at least one metal from the group
  B-1 iron and vanadium in the form of oxides and/or sulfates and/or the group
  B-2 molybdenum, tungsten, nickel, cobalt, copper, chromium and uranium in the form of oxides,
(C) tin in the form of oxides,
(D) metals from the group beryllium, magnesium, zinc, boron, aluminum, yttrium, rare earth elements, silicon, niobium, antimony, bismuth and manganese in the form of oxides, where the components are present in the atom ratios A to B to C to D=(1) to (0.01–10) to (0–0.2) to (0–0.15).

Useful results can be achieved with such a catalytic material in the reduction of the nitrous oxides. The conversion of NO into $N_2$ at the maximum conversion rate is limited here to a relatively small temperature range.

SUMMARY OF THE INVENTION

An object of the invention is to expand the temperature range in which the catalytic material for reducing nitrous oxides in flue gases in the presence of ammonia can be used with maximum conversation rate. A further object is to provide a manufacturing method more gentle to the environment as well as a less expensive method of manufacture of the catalytic material.

With the foregoing and other objects in view, there is provided in accordance with the invention a catalytic material for reducing nitrous oxides in flue gases in the presence of ammonia, comprising, titanium oxide milled with vanadium oxide and one or more oxides of the elements selected from the group consisting of tungsten, molybdenum, phosphorus, chromium copper, iron and uranium and subsequently subjected to at least one thermal treatment, wherein the oxides of the elements tungsten and molybdenum are substituted partially or entirely by phosphorus in the form of its oxides or phosphates, and the sum of the elements (used in the form of oxides) tungsten, molybdenum, vanadium, chromium, copper, iron and uranium are present in amounts of less than 1 atom percent referred to titanium, and phosphorus (used in the form of its oxides or phosphates) is present in amounts of 1 to 30 atom percent, referred to titanium.

Other features which are considered as characteristic for the invention are set forth in the appended claims.

Although the invention is illustrated and described herein as embodied in catalytic material for the reduction of nitrous oxides, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings in which.

DESCRIPTION OF THE PREFERRED EMBOIMENTS

Figures 1, 2:
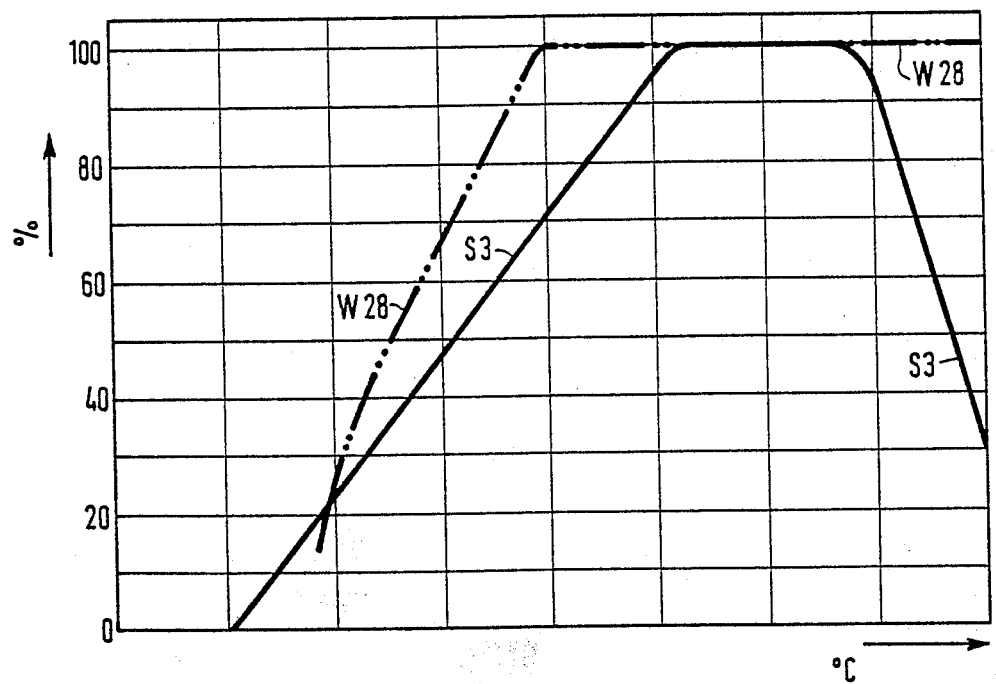
FIG. 1 gives the percentage composition of the main components of two different catalytic materials, and FIG. 2 gives the dependence of NO conversion rate on the reaction temperature for the different catalytic materials.

A cost reduction in the production of catalytic material for reducing nitrous oxides in flue gases in the presence of ammonia is achieved by partial or complete substitution of the oxides of the elements tungsten and molybdenum by less expensive phosphorus in the form of its oxides or phosphates as for example $P_2O_5$, $P_2O_4$ and $P_2O_3$ and/or ortho phosphoric acid and pyrophosphoric acid. At the same time, the temperature range is expanded, with maximum conversion rate, toward higher temperatures by employing these modified catalytic materials. Also by the additional further substitution of molybdenum by phosphorus in the form of its oxides or phosphates by sulfur in the form of sulfites and/or sulfates, for example sulfuric or sulfurous acids, a further cost reduction in the manufacture is achieved.

In a practical further embodiment of the invention, the titanium oxide can be milled with one or more of the other components and then subjected to a thermal treatment of 200° to 900° C., and the intermediate product can subsequently again be milled with one or more components and subjected to a further thermal treatment. This mode of production makes possible a stepwise coating of the titanium dioxide.

In a particularly advantageous embodiment of the invention, this last-mentioned mode of production is carried out by milling the titanium oxide prior to the first temperature treatment, with one or more of the other metal oxides, but with the exclusion of vanadium oxide.

Further details of the invention will be explained with the aid two embodiment examples:

In FIG. 1, the atom percentage of a catalytic material designated "S3" consisting of titanium oxide ($TiO_2$), tungsten oxide ($WO_3$) and vanadium oxide ($V_2O_5$) is given. Its essential elements titanium, tungsten and vanadium have the ratio of 72:23:4 to each other as expressed in atom percent. This catalyst "S3" serves in the the following as a reference catalyst; it stems from DE-AS No. 24 58 888 and was produced substantially according to the method described therein in column 49, line 34, to column 50, line 14.

The catalyst was tested in an integral reactor, and a test gas consisting of NO, $NH_3$, $O_2$ and $N_2$ as well as smaller amounts of $SO_2$ and $H_2O$ was employed. FIG. 2 shows the dependence of the conversion rate on the reaction temperature. It is seen here that the conversion from NO to $N_2$, which sets in at a given temperature, approaches, if the temperature is raised, a maximum value at which all the NO is converted into $N_2$ and declines again above a certain temperature range. The maximum conversion rate extends here only over a temperature range about 200° C. wide. As a consequence, the flue gas temperature at the point of the catalyst must be controlled for this temperature range unless the combustion plant is run at constant power output.

In contrast to this known catalyst "S3+, a catalyst "W28" according to the invention, was made of titanium oxides in a calcined anatase modification. This material was milled together with vanadium oxide and different phosphates and phosphorus oxides in a suspension with deionized water with about 30% solids content and calcined after predrying at about 500° C. The product obtained was then comminuted prior to the testing. This catalytic material designated "W28" contains as is shown in FIG. 1, 89 atom percent titanium, no tungsten, only 0.8 atom percent vanadium and 10.2 atom percent phosphorus.

FIG. 2 shows the temperature dependence of the conversion rate when the W28 material was used under the same test conditions as the S3 material. It is seen that though with the W28 material the conversion of NO to $N_2$ sets in at a somewhat higher temperature than with the known catalytic material "S3", however with W28 the conversion rate rises more steeply and the maximum conversion rate is reached at a lower temperature. It is particularly striking that this catalytic material "W28" retains its maximum conversion rate in a higher temperature range as compared with "S3" and differs advantageously from the latter.

The advantage of this new catalytic material manifests itself in the operation of the combustion plant with variable power output particularly by the fact that thereby, temperature fluctuations at the point of the catalyst remain without influence on the conversion rate. A further advantage of the catalyst according to the invention is that it was prepared by a new manufacturing process which does not contaminate the environment. Different starting materials are used and purely mechanical and thermal manufacturing procedures are used. Neither chemical plants are required nor are waste water problems of any kind encountered. In particular, the automatic liberation of ammonia or ammonia compounds and other reportabl materials is eliminated as in the known manufacturing method of the catalyst "S3". In addition, the process cycle and the process monitoring in this new manufacturing method is simpler and therefore more economical. A further cost reduction is obtained by substituting the expensive tungsten and vanadium oxide by a phosphorus oxide or phosphate, respectively.

Instead of the deionized water used, the suspension of the starting materials can take place as well in an organic liquid such as alcohol. In all cases, eccentric cam mills and ring chamber mills have been found practical as mills.

We claim:

1. Method for reducing nitrous oxides in flue gases, which comprises contacting a flue gas containing nitrous oxides, in the presence of ammonia, in a temperature range of 150° to 550° C., with a catalytic material, formed by subjecting, titanium oxide milled with vanadium oxide and one or more oxides of the elements selected from the group consisting of tungsten, molybdenum, phosphorus, chromium, copper, iron and uranium to at least one termal treatment, wherein the oxides of the elements tungsten and molybdenum are substituted partially or entirely by phosphorous in the form of its oxides or phosphates, and the sum of the elements used in the form of oxides, tungsten, molybdenum, vanadium, chromium, copper, iron and uranium are present in amounts of less than 1 atom percent referred to titanium and phosphorus used in the form of its oxides or phosphates, is present in amounts of 1 to 30 atom percent, referred to titanium.

2. Method according to claim 1, wherein the oxides of the elements tungsten and molybdenum are substituted partially also by sulfur in the form of sulfites or sulfates and the sum of the elements used in the form of oxides, tungsten, molybdenum, vanadium, chromium, copper, iron and uranium are present in amounts of less than 1 atom percent referred to titanium, wherein said phosphorus in the form of its oxides or phosphates and said sulfur used in the form of sulfates or sulfites together are present in amount of 1 to 30 atom percent, referred to titanium.

3. Method according to claim 1, wherein the titanium oxide is milled with one or more oxides of the other components and then is subjected to a thermal treatment and the intermediate product is subsequently milled again with one or more oxides of the other components an is subjected to a further thermal treatment.

4. Method according to claim 3, wherein the first milling takes place with the exclusion of vanadium oxide.

5. Method according to claim 3, wherein many milling stages and thermal treatment stages are alternatingly arranged one after the other and further oxides of the other elements are added to each milling stage.

6. Method according to claim 1, wherein the material is heated in the thermal treatment to a temperture in the range of 200° to 900° C.

7. Method according to claim 1, wherein the milling takes place in the presence of inorganic or organic liquids.

8. Method according to claim 1, wherein the components after milling together have a surface of 10 to 500 $m^2/g$.

* * * * *